(12) United States Patent
Hesselberg et al.

(10) Patent No.: US 7,334,511 B2
(45) Date of Patent: Feb. 26, 2008

(54) SAW BLADE AND SAW

(75) Inventors: Peter Hesselberg, Holbaek (DK); Robert Field, München (DE); Manfred Geier, Puchheim (DE)

(73) Assignee: Irwin Industrial Tools GmbH, Hallbeergmoos (DE)

( * ) Notice: Subject to any disclaimer, the term of this patent is extended or adjusted under 35 U.S.C. 154(b) by 76 days.

(21) Appl. No.: 11/173,599

(22) Filed: Jul. 1, 2005

(65) Prior Publication Data
US 2006/0130630 A1 Jun. 22, 2006

(30) Foreign Application Priority Data
Dec. 17, 2004 (DE) .................. 10 2004 060 972

(51) Int. Cl.
*B27B 33/02* (2006.01)
(52) U.S. Cl. .................. 83/835; 83/850; 83/855
(58) Field of Classification Search .......... 83/835–855, 83/661
See application file for complete search history.

(56) References Cited
U.S. PATENT DOCUMENTS

| | | | | |
|---|---|---|---|---|
| 3,176,732 A | | 4/1965 | Henderson | |
| 3,374,815 A | * | 3/1968 | Anderson, Jr. et al. | 83/852 |
| 3,651,841 A | * | 3/1972 | Ohlsson | 83/852 |
| 3,712,348 A | * | 1/1973 | Kulik et al. | 83/835 |
| 4,232,578 A | * | 11/1980 | Stellinger et al. | 83/661 |
| 4,501,184 A | | 2/1985 | Scott et al. | |
| 4,557,172 A | * | 12/1985 | Yoneda | 83/848 |
| 4,590,837 A | * | 5/1986 | Nanba | 83/846 |
| 4,784,033 A | * | 11/1988 | Hayden et al. | 83/661 |
| 4,913,022 A | * | 4/1990 | Kuklinski | 83/849 |
| 5,477,763 A | * | 12/1995 | Kullman | 83/846 |
| 5,697,280 A | * | 12/1997 | Armstrong et al. | 83/848 |
| 5,848,473 A | * | 12/1998 | Brandenburg, Jr. | 30/514 |
| 6,158,324 A | * | 12/2000 | Kullmann et al. | 83/848 |
| 2005/0028664 A1 | * | 2/2005 | Terada et al. | 83/835 |
| 2005/0056135 A1 | * | 3/2005 | Hall et al. | 83/851 |

* cited by examiner

Primary Examiner—Boyer D. Ashley
Assistant Examiner—Laura M. Lee
(74) Attorney, Agent, or Firm—Dennis J. Williamson; Moore & Van Allen PLLC

(57) ABSTRACT

A saw blade comprising a series of teeth at a longitudinal edge thereof, arranged in alternate directions and formed in a tooth shape as defined by a first flank angle, a second flank angle, and a rake angle, is characterized in that the first flank angle lies between approximately 50.0° to 54.0°, the second flank angle lies between approximately 14.0° to 16.0°, and the rake angle lies between approximately 11.0° to 14.0°.

18 Claims, 1 Drawing Sheet

SAW BLADE AND SAW

The invention relates to a saw blade comprising a series of teeth at a longitudinal edge thereof which are wrenched in alternate directions.

BACKGROUND OF THE INVENTION

A great many tooth shapes are in use for manually operated saws or motor-driven saws having a saw blade which is operated in alternating movements back and forth. Among others, the tooth shapes probably encountered most frequently with longitudinal saw blades are: AV tooth shape, KV tooth shape, M tooth shape, NU tooth shape, NV tooth shape, PV tooth shape.

The per se known tooth shapes are illustrated diagrammatically in the accompanying FIG. 1. The AV tooth is defined as a symmetrical triangular tooth. The KV tooth is defined by an asymmetrial tooth body having a chamfered relief, the tooth body extending from a reinforced broad tooth base along a second flank which includes a so-called second flank angle with a plane perpendicular to the saw blade. In the range of the tooth crest, the second flank is followed by a first flank which is less inclined than the second one and extends at a first flank angle with respect to the plane perpendicular to the saw blade. From the crest, the tooth body extends continuously linearly to the tooth base along the rake edge which is located opposite the first and second flanks. The so-called M tooth has the shape of the letter M, a little flute being formed in the middle of the crest. The M tooth has equilateral, parallel cutting flanks. The NU tooth shape is defined by an asymmetrical triangular tooth configuration having a shallow, extended tooth gap between two adjacent teeth each. The NV tooth shape is the same as the NU tooth shape, except that the extended tooth gap between two teeth is missing. The PV tooth configuration likewise is defined by an asymmetrical triangular tooth shape. However, the relief is curved and the base of the tooth gap is very much rounded.

No matter what the shape, the saw teeth normally are wrenched in alternate directions, in other words bent alternatingly to the right or left in order to prevent the sawing from becoming untrue.

OBJECT OF THE INVENTION

It is an object of the invention to develop a saw blade, especially for a handsaw, for separating cellulose materials, such as wood, which offers increased sawing efficiency at unvarying sawing work and/or reduces the sawing force to be applied for a predetermined quantity of chips cut by the saw blade.

SUMMARY OF THE INVENTION

The saw blade thus comprises a series of teeth at a longitudinal edge thereof, wrenched in alternate directions, and formed in KV tooth shape which is defined by a first flank angle, a second flank angle, and a rake angle. In one embodiment the first flank angle lying between about 50.0° to 54.0°, the second flank angel lying between about 14.0° to 16.0°, and the rake angle lying between about 11.2° to 14.0°.

It was found after many comparative tests that the most favorable configuration of teeth for working wood material, such as birch, pine and stone pine, medium density fiber pieces (MDF boards), and the like with a saw blade, either in a handsaw or in a mechanical saw, is one where the saw blade has a series of teeth of KV tooth shape. Surprisingly, the tests further demonstrated that changing the angular dimensions in a range of several ten minutes, especially half a degree resulted in distinct improvement or deterioration of the sawing performance. An expensive test series, to be explained and evaluated in greater detail below, unexpectedly, revealed that both the sawing efficiency and the sawing force are optimized in the angular range limits combined according to the invention.

In the case of a first preferred embodiment of the invention, the best sawing results were achieved when a combination of angles was defined as follows: approximately 53° to 54°, preferably about 53.6° for the first flank angle; approximately 14° to 15°, preferably about 14.6° for the second flank angle; and approximately 13° to 14°, preferably about 13.3° for the rake angle.

With a second alternative preferred embodiment of the saw blade it was particularly advantageous if the combination of angles in the saw blade was as follows: the first flank angle between approximately 50.0° and 51.0°, preferably at about 50.7°; the second flank angle between approximately 15.0° and 16.0°, preferably at about 15.7°; and the rake angle between approximately 12.0° and 13.0°, especially at 12.8°.

With a third preferred embodiment the best test results were obtained when approximately 53.0° to 54.0°, preferably about 53.2° were selected for the first flank angle; approximately 13.5° to 14.5°, preferably about 14.0° were selected for the second flank angle; and approximately 11.2° to 12.0°, preferably about 11.8° were selected for the rake angle.

It was especially surprising that the dimensions indicated above of the first flank angle, the second flank angle, and the rake angle of a KV tooth configuration always provided excellent cutting results, regardless of the longitudinal dimension of the tooth itself and of the wood material to be sawed. For example, it was found that the best sawing results are obtained for the three alternatives mentioned above if the tooth pitch of the respective series of teeth is fixed within a range of between two to four teeth per inch (25.4 mm), especially about 2.3 to 3.4 teeth per inch, preferably approximately 3.2 or 2.5 teeth per inch.

Surprisingly, the optimum value of the tooth pitch was found to be approximately 3.2 teeth per inch, especially with the first preferred combination of angles of the first flank angle, second flank angle, and rake angle. At this value the best sawing results were obtained, and this is the value which is decisive also for the third preferred combination of angles.

The optimum tooth pitch for the second preferred choice of combined angles was a value of 2.5.

The inventor undertook testing to verify this optimized sawing performance of saw blades, including the most varied combinations of flank angles and rake angles, applied to a plurality of similar fibrous articles to be sawed at constant environmental conditions. A first test series was carried out on a piece of birch, 34×30 mm in size. In a second test series, sawing processes were initiated on a piece of pine having a cross section of 74×34 mm. A third representative test series was carried out with saw blades of varying combinations of flank angles and rake angles to saw a medium density fiber board having a cross section of 74×30 mm.

The test structure in each case was made up of a saw clamped in a dynamometer to determine the sawing force applied with each type of saw in forward feeding direction of the saw blade and in vertical transverse direction. Moreover, a measuring instrument was coordinated with the workpiece to determine the cutting quantity by way of the weight of the chips cut by the saw blade or by the volume removed from the article being sawed. It should be clear that essentially the same tool materials, especially the same tool steel having essentially the same surface properties were used for each of the saw blades tested.

A test magnitude SCE is defined to determine a value of the sawing efficiency. It permits statements to be made regarding the sawing efficiency of the respective type of saw blade. The test magnitude SCE is determined by the following parameters:

cutting force F, as measured by the dynamometer;
length L of the stroke of the saw, essentially being the same for essentially each type of saw due to identical external configurations of the saw blade;
number N of strokes of the saw for separating the article being worked;
cross sectional area A in the cutting plane of the article being worked;
width B of the cutting groove and calculated according to the following equation $$SCE=(FLN)/AB.$$

It was found that the SCE value is influenced considerably by a change of no more than one of the three angles which determine the configuration of the KV tooth shape in ranges less than 0.5°.

In a first test run, a known saw blade marketed under the trade designation Sharptooth 15-334 by the enterprise including the company component Stanley Works and having a rake angle of about 18.0°, a first flank angle of about 63.0°, and a second flank angle of about 11.0°, was compared with the third embodiment according to the invention of the saw blade having a first flank angle at approximately 53.0° to 54.0°, preferably about 53.2°, a second flank angle at approximately 13.5° to 14.5°, preferably about 14.0°, and a rake angle at approximately 11.2° to 12.0°, preferably about 11.8°. Both saws had substantially the same tooth pitch. When the saw blade according to the invention was used with the piece of pine the sawing efficiency SCE was increased by more than 26% and the chip quantity by more than 43% over what was achieved with the known saw blade. This was so in spite of the fact that the sawing force to be applied with the saw blade according to the invention was raised by no more than up to 13%. With the piece of birch, the resulting SCE improvement was more than 43% and the increase in chip quantity more than 41% although the sawing force to be applied was augmented only by up to 1%. The results with the MDF piece showed an SCE improvement of more than 22% and an increase of the chip quantity of more than 17% although the sawing force to be applied was raised by up to 3% only.

In a second test run, the saw blade distributed by the above mentioned company, Stanley Works, under the trade designation Sharptooth 20-065, and having a rake angle of 15.0°, a first flank angle of approximately 56.0°, and a second flank angle of approximately 17.0°, was compared with the second embodiment according to the invention which had a first flank angle between approximately 50.0° and 51.0°, especially about 50.7°, a second flank angle at approximately 15.0° to 16.0°, especially at about 15.7°, and a rake angle at approximately 12.0° to 13.0°, especially at 12.8°. Both saws had substantially the same tooth pitch. With the piece of pine, an increase in sawing efficiency SCE of more than 27% and an in increase of the chip quantity of more than 56% were achieved as compared to the above mentioned known saw blade. This was accomplished although the sawing force to be applied with the saw blade according to the invention was increased by no more than up to 7%. In the case of the piece of birch, the SCE improvement was more than 27% and the increase of the chip quantity more than 36% although, once again, the sawing force to be applied was raised by only up to 1%.

In a third test run, a known saw blade marketed under the trade designation ProCut by the enterprise including the company component Bahco and having a rake angle of about 12.0°, a first flank angle of about 52.0°, and a second flank angle of about 24.0°, was compared with the third embodiment according to the invention of the saw blade having a first flank angle at approximately 53.0° to 54.0°, preferably about 53.2°, a second flank angle at approximately 13.5° to 14.5°, preferably about 14.0°, and a rake angle at approximately 11.2° to 12.0°, preferably at about 11.8°. Both saws had substantially the same tooth pitch. When the saw blade according to the invention was used with the pine piece, the sawing efficiency SCE was better by 54% and the chip quantity greater by more than 53% than with the known ProCut saw blade. At the same time, the sawing force to be applied with the saw blade according to the invention was not increased by more than up to 7%.

DETAILED DESCRIPTION OF EMBODIMENTS OF THE INVENTION

In a fourth test run, a known saw blade marketed under the trade designation "Superior Laminator" by the enterprise including the company component Bahco and having a rake angle of about 15.0°, a first flank angle of about 54.0°, and a second flank angle of about 26.0°, was compared with the second embodiment according to the invention of the saw blade which had a first flank angle at approximately 50.0° to 51.0°, preferably at about 50.7°, a second flank angle at approximately 15.0° to 16.0°, preferably at about 15.7°, and a rake angle at approximately 12.0° to 13.0°, especially at about 12.8°. Both saws had substantially the same tooth pitch. When the saw blade according to the invention was used with the birch piece, increases in sawing efficiency SCE of more than 11% and of the chip quantity of more than 12% over the known saw were recorded although the sawing force to be applied was increased by no more than up to 1%.

The invention also relates to a saw, especially a handsaw comprising a saw blade according to the invention.

Figure 1:
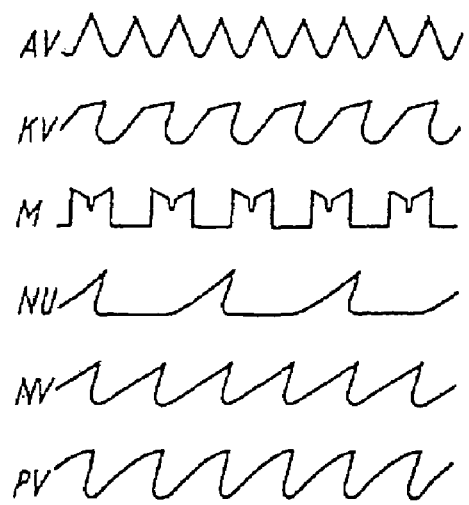
FIG. 1 shows diagrammatically known tooth shapes.
Figure 2:
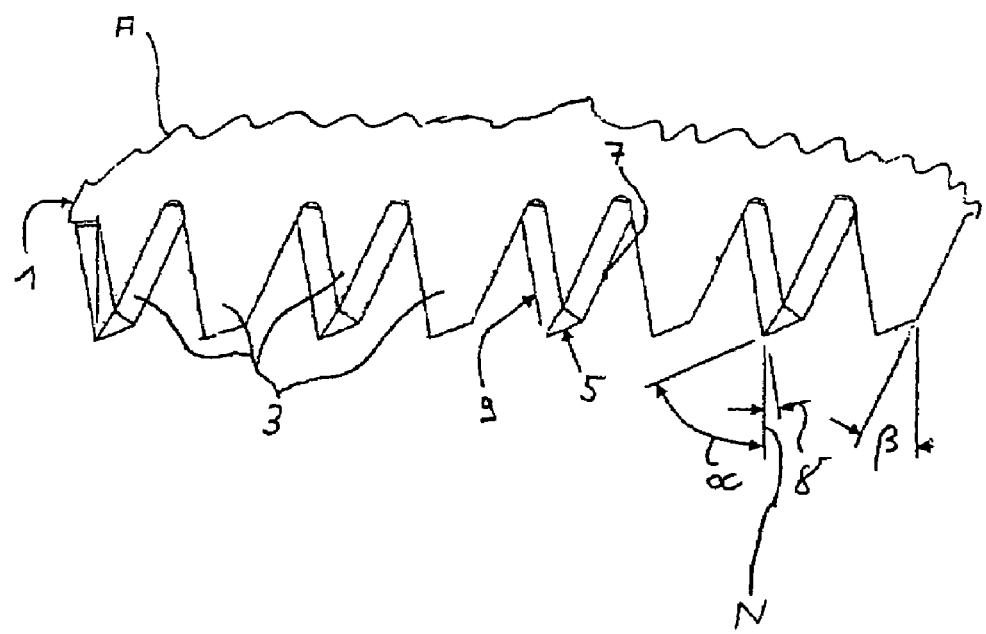
FIG. 2 shows a portion of a saw blade according to one embodiment of the invention.

Other advantages, properties, and characteristics of the invention will become apparent from the description below of a preferred embodiment and from the accompanying drawing. FIG. 2 illustrates a part A of a saw blade according to the invention having a KV shape of the teeth which are wrenched in alternate directions, also referred to as Hannibal toothing.

The saw blade 1 according to the invention comprises a series of teeth 3 of KV tooth shape, wrenched in alternate directions, and defined by a first flank angle $\alpha$, a second flank angle $\beta$, and a rake angle $\gamma$. The first flank angle $\alpha$ results from the circumferential area between a first flank 5 of the tooth 3 and the line N perpendicular to the saw blade, the second flank angle β results from the circumferential area between the second flank 7 of the tooth 3 and the line N perpendicular to the saw blade, and the rake angle γ results from the circumferential area between the rake edge 9 of the tooth 3 and the line N perpendicular to the saw blade.

In a first alternative embodiment, a value of 13.3° is provided for the rake angle γ, a value of 53.6° is provided for the first flank angle α and a value of 14.6° is provided for the second flank angle β.

In a second alternative embodiment, the KV tooth shape is defined by a rake angle γ of 12.8°, a first flank angle α of 50.7°, and a second flank angle β of 15.7°. With this embodiment, the tooth pitch is fixed at 2.54 teeth per inch.

In a third preferred embodiment, the rake angle γ is fixed at 11.8°, the first flank angle α at 53.2°, and the second flank angle β at 14°. The tooth pitch in this case is set at 3.2 per inch.

The features disclosed in the specification above, in the figures and claims may be significant for implementing the invention in its various embodiments, both individually and in any combination.

What is claimed is:

1. A saw blade comprising a series of teeth at a longitudinal edge thereof, said teeth arranged in alternate directions and each tooth comprising a rake edge, a first flank and a second flank formed in a shape which is defined by said rake edge defining the front of the tooth, said second flank extending from the base of the tooth and said first flank extending from the second flank to said rake edge, a first flank angle α, between a first flank of the tooth and a line perpendicular to the saw blade, in a plane parallel to the longitudinal edge, a second flank angle β, between a second flank of the tooth and a line perpendicular to the saw blade, in said plane, and a rake angle γ, between a rake edge of the tooth and a line perpendicular to the saw blade, in said plane, wherein the first flank angle α lies between about 50.0° to 54.0°, the second flank angle β lies between about 14.0° to 16.0°, and the rake angle γ, lies between about 11.2° to 14.0°.

2. A saw blade as claimed in claim 1, wherein the first flank angle α lies between about 53.0° to 54.0°, the second flank angle β lies between about 14.0° to 15.0°, and the rake angle γ lies between about 13.0° to 14.0°.

3. A saw blade as claimed in claim 1, characterized in that the tooth series has a tooth pitch between 2 to 4 teeth per inch.

4. A saw blade as claimed in claim 1, wherein the first flank angle α is 53.6°.

5. A saw blade as claimed in claim 1, wherein the second flank angle β is 14.6°.

6. A saw blade as claimed in claim 1, wherein the rake flank angle γ is 13.3°.

7. A saw blade as claimed in claim 3, characterized in that the tooth series has a tooth pitch between about 2.3 to 3.4 teeth per inch.

8. A saw blade as claimed in claim 3, characterized in that the tooth series has a tooth pitch of about 3.2 teeth per inch.

9. A saw blade as claimed in claim 3, characterized in that the tooth series has a tooth pitch of about 2.5 teeth per inch.

10. A saw blade comprising a series of teeth at a longitudinal edge thereof, said teeth arranged in alternate directions and extending along said longitudinal edge to create a cutting plane and each tooth comprising a rake edge, a first flank and a second flank formed in a shape which is defined by said rake edge defining the front of the tooth, said second flank extending from the base of the tooth and said first flank extending from the second flank to said rake edge, a first flank angle α, between a first flank of the tooth and a line perpendicular to the saw blade, in a plane parallel to the longitudinal edge, a second flank angle β, between a second flank of the tooth and a line perpendicular to the saw blade, in said plane, and a rake angle γ, between a rake edge of the tooth and a line perpendicular to the saw blade, in said plane, wherein the first flank angle a lies between about 50.0° to 54.0°, the second flank angle β lies between about 14.0° to 16.0°, and the rake angle γ, lies between about 11.2° to 14.0°.

11. A saw blade as claimed in claim 10, wherein the first flank angle α lies between about 53.0° to 54.0°, the second flank angle β lies between about 14.0° to 15.0°, and the rake angle γ lies between about 13.0° to 14.0°.

12. A saw blade as claimed in claim 10, characterized in that the tooth series has a tooth pitch between 2 to 4 teeth per inch.

13. A saw blade as claimed in claim 10, wherein the first flank angle α is 53.6°.

14. A saw blade as claimed in claim 10, wherein the second flank angle β is 14.6°.

15. A saw blade as claimed in claim 10, wherein the rake flank angle γ is 13.3°.

16. A saw blade as claimed in claim 12, characterized in that the tooth series has a tooth pitch between about 2.3 to 3.4 teeth per inch.

17. A saw blade as claimed in claim 12, characterized in that the tooth series has a tooth pitch of about 3.2 teeth per inch.

18. A saw blade as claimed in claim 12, characterized in that the tooth series has a tooth pitch of about 2.5 teeth per inch.

* * * * *